B. S. WHITE.
METHOD OF MANUFACTURING LEAD SULFATE.
APPLICATION FILED OCT. 16, 1915.
1,187,949. Patented June 20, 1916.
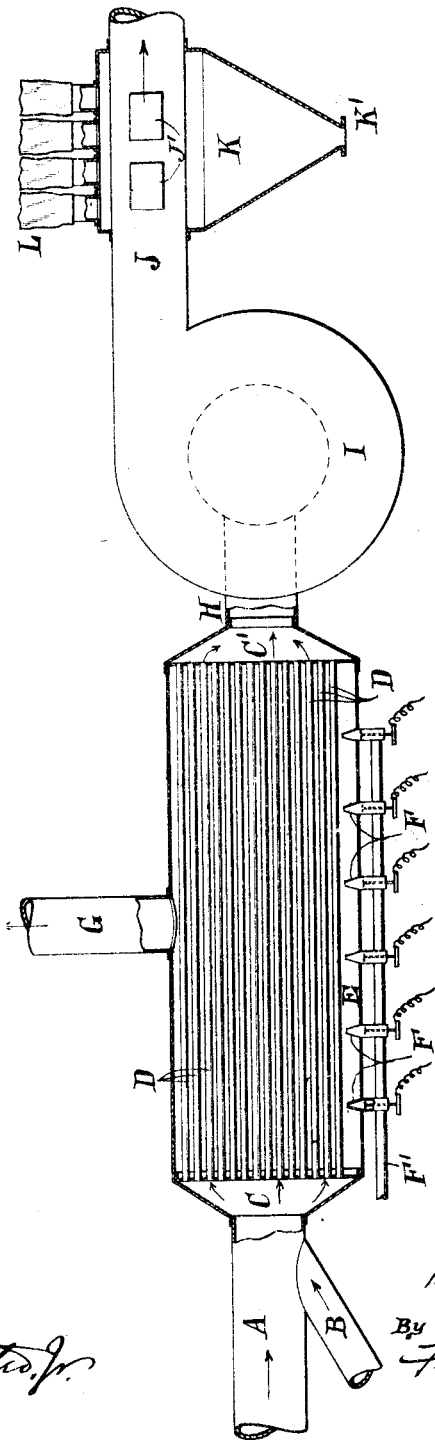
Witness
Daniel Webster, Jr.
Inventor
Bernard S. White
By Francis T. Chambers
his Attorney

UNITED STATES PATENT OFFICE.

BERNARD S. WHITE, OF JOPLIN, MISSOURI, ASSIGNOR TO PICHER LEAD COMPANY, OF JOPLIN, MISSOURI, A CORPORATION OF MISSOURI.

METHOD OF MANUFACTURING LEAD SULFATE.

1,187,949.  Specification of Letters Patent.  Patented June 20, 1916.

Application filed October 16, 1915. Serial No. 56,220.

*To all whom it may concern:*

Be it known that I, BERNARD S. WHITE, a citizen of the United States, residing in Joplin, in the county of Jasper and State of Missouri, have invented certain new and useful Improvements in Methods of Manufacturing Lead Sulfate, of which the following is a true and exact description, reference being had to the accompanying drawings, which form a part thereof.

My invention relates to the manufacture of lead sulfate and particularly to the manufacture of basic lead sulfate though it is also adapted to produce the neutral lead sulfate.

The object of my invention is to produce a lead sulfate of any desired composition and of a fine state of division from litharge as a basic material and my invention consists in the process of forming a vapor or fume of litharge by blowing hot air over melted litharge, mixing sulfur dioxid gas with said fume and an excess of air and heating said mixed gases and fume to promote their chemical union and the formation of a lead sulfate which is neutral or basic to any desired degree, in accordance with the proportion of sulfur dioxid gas in the mixture.

Reference being had to the drawing which illustrates diagrammatically an apparatus suitable for use with my new process, A is a flue leading from a furnace wherein litharge is melted and from which the fumed litharge mixed with air and furnace gases passes to the flue.

B is a flue leading from a source of sulfur dioxid gas into the flue A.

C is a header into which the mixed gases pass and from which they pass through tubes or flues D to the header C' and thence through flue H and suction fan I to flue J which delivers them through ports J' to the boxes K one only of which is shown in the drawing. To the tops of the boxes K are connected screenbags L which permit the gases to escape, the screened sulfate falling into the hopper bottom K' of box K from which it is withdrawn from time to time. The flues D are inclosed in a casing E which, as shown, is heated internally by gas burners F connected to pipe F'.

G is the escape flue of casing E.

In making neutral lead sulfate which consists of 73.60 per cent. of lead oxid and 26.50 per cent. of sulfate trioxid there would theoretically be required 21.2 per cent. of sulfur dioxid formed from 10.60 per cent. of sulfur. In practice however there must be a slight excess of sulfur dioxid, that is to say there would be required slightly more than 10.60 pounds of sulfur for each 73.60 pounds of lead oxid passing to the combining flues in the form of fumed litharge.

Where it is desired to produce a basic lead sulfate it is only necessary to supply the lead oxid fume in greater proportion to the sulfur dioxid than where the neutral sulfate is to be produced. A typical instance would be the formation of a basic lead sulfate containing 16 per cent. lead oxid and 84 per cent. lead sulfate. This compound would contain 22.17 per cent. sulfur trioxid and 77.83 per cent. of lead oxid and in my process would theoretically require the formation of 17.73 per cent. of sulfur dioxid from 8.86 pounds of sulfur for 77.83 pounds of lead oxid fume. In practice there would have to be a slight excess of sulfur converted into gas.

I have found that the temperature of the combining flues should for the best results be such as to maintain the mixed gases at about 975° F.

Having now described my invention, what I claim as new and desire to secure by Letters Patent is,

1. The method of manufacturing lead sulfate which consists in converting litharge into a fume or vapor mixing with such litharge fume, air and sulfur dioxid gas in quantity in slight excess of that theoretically required to produce lead sulfate of the desired composition, and subjecting the mixed fume and gases to heat to insure the chemical union of the components and the formation of a lead sulfate in a fine state of division.

2. The method of manufacturing basic lead sulfate which consists in converting litharge into a fume or vapor, mixing with such litharge fume, air and sulfur dioxid gas in quantity to produce a basic lead sulfate of the desired composition, and subjecting the mixed fume and gases to heat to insure the chemical union of the components and the formation of a basic lead sulfate in a fine state of division.

BERNARD S. WHITE